United States Patent
Yamadaji et al.

(10) Patent No.: US 6,694,363 B1
(45) Date of Patent: Feb. 17, 2004

(54) NETWORK EQUIPMENT AND NETWORKING METHOD

(75) Inventors: Shinji Yamadaji, Kanagawa-ken (JP); Takehiko Okuyama, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 732 days.

(21) Appl. No.: 09/585,575

(22) Filed: Jun. 2, 2000

(30) Foreign Application Priority Data

Jun. 4, 1999 (JP) .......................... 11-158398

(51) Int. Cl.[7] .......................... G06F 15/173
(52) U.S. Cl. ...................... 709/223; 370/257
(58) Field of Search .................. 709/223, 253, 709/248, 227, 226, 224; 710/72, 100; 725/37, 100; 370/257

(56) References Cited

U.S. PATENT DOCUMENTS

| | | | | |
|---|---|---|---|---|
| 5,953,454 A | * | 9/1999 | Iwahashi | 382/218 |
| 6,005,861 A | * | 12/1999 | Humpleman | 370/352 |
| 6,160,796 A | * | 12/2000 | Zou | 370/257 |
| 6,182,094 B1 | * | 1/2001 | Humpleman et al. | 715/513 |
| 6,199,136 B1 | * | 3/2001 | Shteyn | 710/305 |
| 6,219,839 B1 | * | 4/2001 | Sampsell | 725/40 |
| 6,349,352 B1 | * | 2/2002 | Lea | 710/72 |
| 6,363,434 B1 | * | 3/2002 | Eytchison | 709/313 |
| 6,370,550 B1 | * | 4/2002 | Douma et al. | 715/500.1 |
| 6,434,447 B1 | * | 8/2002 | Shteyn | 700/245 |
| 6,446,080 B1 | * | 9/2002 | Van Ryzin et al. | 707/104.1 |
| 6,460,030 B1 | * | 10/2002 | Ludtke | 707/3 |
| 6,519,594 B1 | * | 2/2003 | Li | 707/10 |
| 6,532,535 B1 | * | 3/2003 | Maffezzoni et al. | 713/1 |
| 6,556,219 B1 | * | 4/2003 | Wugofski | 345/762 |
| 6,564,369 B1 | * | 5/2003 | Hove et al. | 717/121 |
| 6,584,496 B1 | * | 6/2003 | Ludtke | 709/217 |
| 6,618,714 B1 | * | 9/2003 | Abrahams | 706/45 |
| 2003/0140313 A1 | * | 7/2003 | Smith | 715/514 |

FOREIGN PATENT DOCUMENTS

| | | | | |
|---|---|---|---|---|
| EP | 000932275 A2 | * | 7/1999 | H04L/12/28 |
| FR | 001058422 A1 | * | 12/2000 | H04L/12/28 |
| JP | 98/03448 | | 8/1998 | |
| WO | WO99/35753 | * | 6/1999 | H04L/1/00 |
| WO | 000929170 A2 | * | 7/1999 | H04L/12/24 |

OTHER PUBLICATIONS

Baxter, "Video Distribution in the Eureka–IHS Network", Jun. 1988, IEEE, pp. 736–743.*

(List continued on next page.)

Primary Examiner—Bunjob Jaroenchonwanit
(74) Attorney, Agent, or Firm—Pillsbury Winthrop LLP

(57) ABSTRACT

A DCM/FCM manager detects the coincidence of modules by comparing a device control module and a device function module transferred from a DCM/FCM memory of other device with a content in the inside of a DCM/FCM memory of its own device. One of coincident modules is deleted and this deletion is stored in the DCM/FCM memory. The DCM/FCM manager generates link information for making use of the deleted module and makes a registry store the link information. In case of controlling the other device, a control part reads out the module from the DCM/FCM memory based on the link information of the registry and generates a command based on the read-out module and transfers the command to the other device. Accordingly, the network equipment can control devices on the network with the least memory capacity.

6 Claims, 13 Drawing Sheets

OTHER PUBLICATIONS

Hanover, "Networking the Intelligent Home", IEEE, Oct. 1989, pp. 48–49.*

Igarashi et al., "Home Network File system for Home Network Based on IEEE–1394 Technology", IEEE Transactions on Consumer Electronic, vol. 45, No. 3, Jun. 1999, pp. 1000–1003.*

Haupt et al, "Specification of the Interconnect System", Deliverable #12, Feb. 1998, 34 pages.*

Serverance, "Linking computers and Consumer Electronics" www.*

Wetzel et al, "Consumer Applications of the IEEE 1394 Serial Bus, and A 1394/DV Video Editing system" IEEE, Jun. 1996, 12 pages.*

Matsushita et al., The HAVI Specification, Specification of the Home Audio/Video Interoperability (HAVi) Architecture, Version, 1.0 beta, Nov. 2, 1998, pp. 1–384.

* cited by examiner

NETWORK EQUIPMENT AND NETWORKING METHOD

BACKGROUND OF THE INVENTION

1. Field of the Invention

This invention relates to a network equipment and a networking method suitable for the network control of home network or the like.

2. Related Art Statement

Recently, the development of techniques for building home networks by interactively connecting home devices in ordinary homes has started. For example, as a network standard which makes use of the IEEE (The Institute of Electrical and Electronics Engineers, Inc) 1394 which has been spread as a digital interface matched to multi media, there exists the HAVi (Home Audio/Video interoperability) which is established by eight Japanese and European companies.

In the network such as the HAVi standard or the like, respective devices are provided with device control modules which constitute software modules for performing condition control of devices. For example, the HAVi standard adopts DCMs (Device Control Modules) as the device or appliance control modules. Among the devices which are connected on the network, a controller having a function of controlling conditions of respective devices is capable of controlling an ON/OFF of power source of respective devices by means of device control modules provided to respective devices.

Further, respective devices are provided with device function modules which have functions available to external devices. For example, the HAVi standard adopts FCMs (Functional Component Modules) as the device function modules. With the use of the FCMs, the controller is capable of making use of functions of various devices such as a timer function, a tuner function and the like.

By the way, to make the controller control other devices and utilize functions of such other devices, it is necessary for the controller to incorporate a unit which is composed of a device control module and a device function module into a memory of its own device. Accordingly, corresponding to the increase of the number of devices connected to the network, the number of units to be stored is increased and hence, there has been a problem that the memory capacity necessary for storing software to control and make use of respective devices is increased.

OBJECTS AND SUMMARY OF THE INVENTION

It is an object of the present invention to provide a network equipment and a networking method which can reduce the memory capacity necessary for storing software to control and utilize functions of respective devices even when devices which are connected to a network are increased in number.

In summary, the network equipment of the present invention includes a first memory which is capable of holding a plurality of software modules which control respective devices connected to a network, a module administration device which detects coincidence portions between or among a plurality of software modules and makes the first memory store one remaining coincidence portion after deleting other coincidence portions with respect to the coincidence portions and generates link information for making use of the remaining coincidence portion in place of deleted coincidence portions, a second memory which holds the link information generated by the module administration device, and a control device which reads out the software module stored in the first memory based on the link information and controls other devices connected to the network.

Further, the network method of the present invention includes a module administration step which detects coincidence portions between or among a plurality of software modules with respect to a plurality of software modules which respectively control respective devices connected to a network and stores one remaining coincidence portion after deleting other coincidence portions with respect to the coincidence portions, a step which holds link information for making use of the remaining coincidence portion in place of deleted coincidence portions, a step which reads but the software module stored based on the link information and controls other devices connected to the network.

These and other objects and advantages of the present invention will become further apparent from the following detailed explanation.

DETAILED DESCRIPTION OF THE PREFERRED EMBODIMENTS

Figure 1:
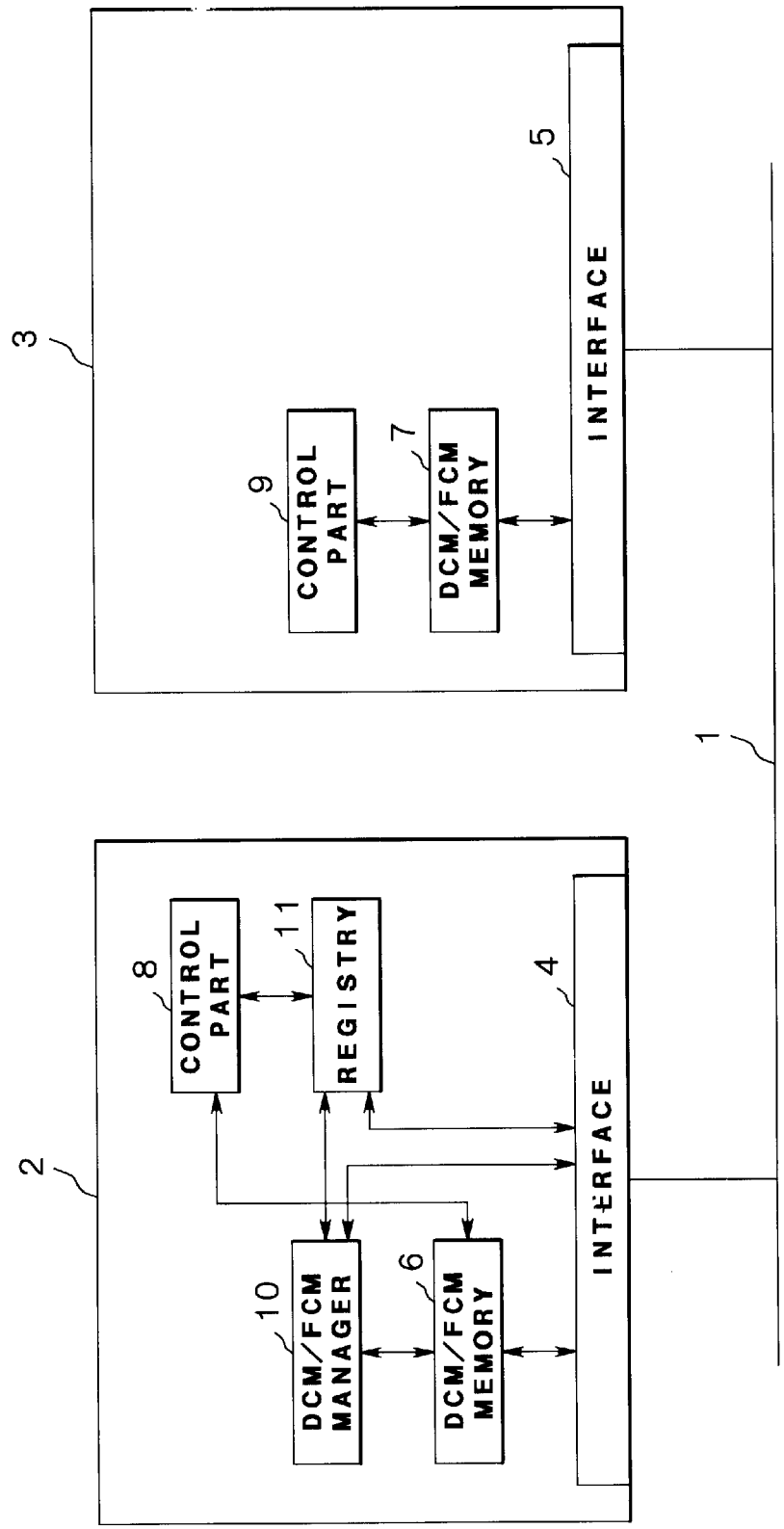
FIG. 1 is block diagram showing one embodiment of a network equipment of the present invention.

Embodiments of the present invention are explained hereinafter in conjunction with attached drawings. FIG. 1 is a block diagram showing one embodiment of the network equipment according to the present invention.

In FIG. 1, for example, two sets of devices 2, 3 are connected to a network cable 1. Among a plurality of devices connected to the network cable 1, at least one device has a controller function of controlling and making use of other devices. In the example shown in FIG. 1, the device 2 has the controller function and the device 3 constitutes a target to be controlled and made use of by the controller. It is apparent that a device which is provided with a controller function by having the similar constitution as that of the controller can be the target.

The devices 2, 3 are connected to the network cable 1 through interfaces 4, 5 provided corresponding to the network. The interfaces 4, 5 transfer data from the inside of respective devices 2, 3 to the network cable 1, while the data transferred through the network cable 1 is taken in or incorporated into the insides of the devices 2, 3.

The devices 2, 3 respectively include DCM/FCM memories 6, 7. The DCM/FCM memories 6, 7 hold device control modules which constitute software modules for performing the condition control of devices per se. Data for controlling the condition of the devices are described in the device control modules. For example, information on the power source control of devices, control on network connection and controls corresponding to other various functions are described.

Further, the DCM/FCM memories 6, 7 hold device function modules which have functions available to external devices. With the use of the device function modules, the controller is capable of making use of functions of respective devices such as timer functions and tuner functions.

Devices 2, 3 are respectively controlled by control parts 8, 9 based on the device control modules. For example, in each device 2, 3 which constitutes a unit body, each control part 8, 9 performs controls of the device 2, 3 based on the device control module stored in each DCM/FCM memory 6, 7. For example, when a power source OFF signal is given by a remote controller manipulation, the device control modules stored in respective DCM/FCM memories 6, 7 are read out and a power source OFF control is performed.

In this embodiment, a DCM/FCM memory manager 10 is designed to transfer the device control module and the device function module stored in the DCM/FCM memory of the target device to the DCM/FCM memory of the controller device. In the example shown in FIG. 1, the device control module and the device function module stored in the DCM/FCM memory 7 of the target device 3 are transferred to and stored in the DCM/FCM memory 6 of the device 2 through the interface 5, the network cable 1 and the interface 4.

In response to the transfer of the device control module and the device function module, the DCM/FCM manager 10 is designed to store the correspondence between respective devices and respective device control modules and device function modules in a registry 11. Further, in this embodiment, the DCM/FCM manager 10 detects the coincidence portions (agreed or common portions) of the stored device control modules and device function modules. Then, with respect to the coincidence portions, only one coincidence portion is reserved while other coincidence portions are erased from the DCM/FCM memory 6 and link information for making use of the remaining one module in place of erased modules is designed to be stored in the registry 11.

For example, in case both devices 2, 3 which are connected to the network are same kind of devices of a same maker, it is considered that their device control modules are same. In this case, when the DCM/FCM manager 10 detects the coincidence, the device control module transferred from one device 3 is erased from the DCM/FCM memory of the device 2 and the link information that the device control module for the device 2 stored in the DCM/FCM memory 6 of the device 2 is used as the device control module for controlling the device 3 is stored in the registry 11.

Based on the link information stored in the registry 11, the control part 8 reads out the device control modules and the device function modules stored in the DCM/FCM memory 6 and performs the control of and makes use of the own device and the other device connected to the network.

Figure 2:
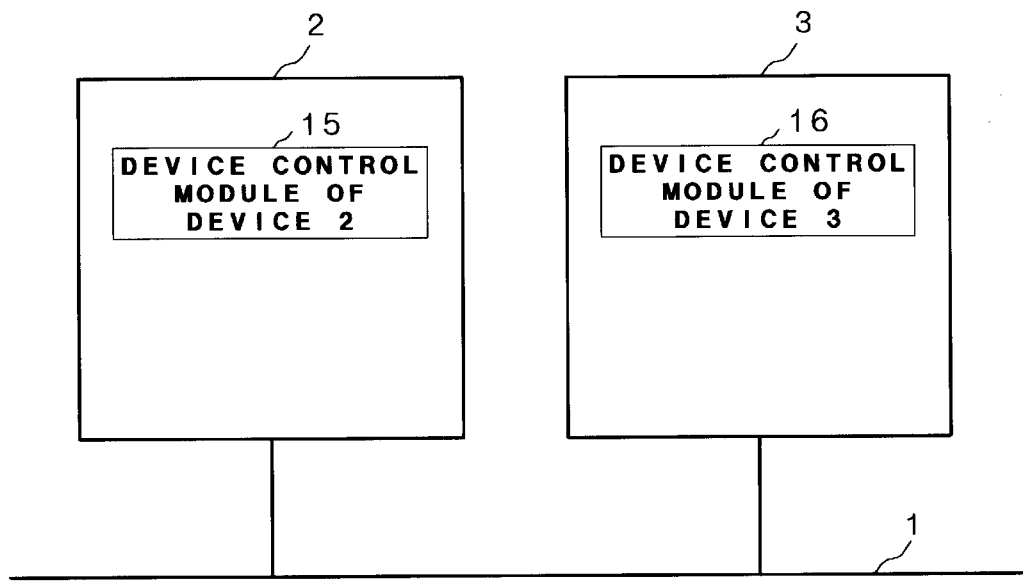
FIG. 2 is an explanatory view explaining the embodiment shown in FIG. 1.
Figure 3:
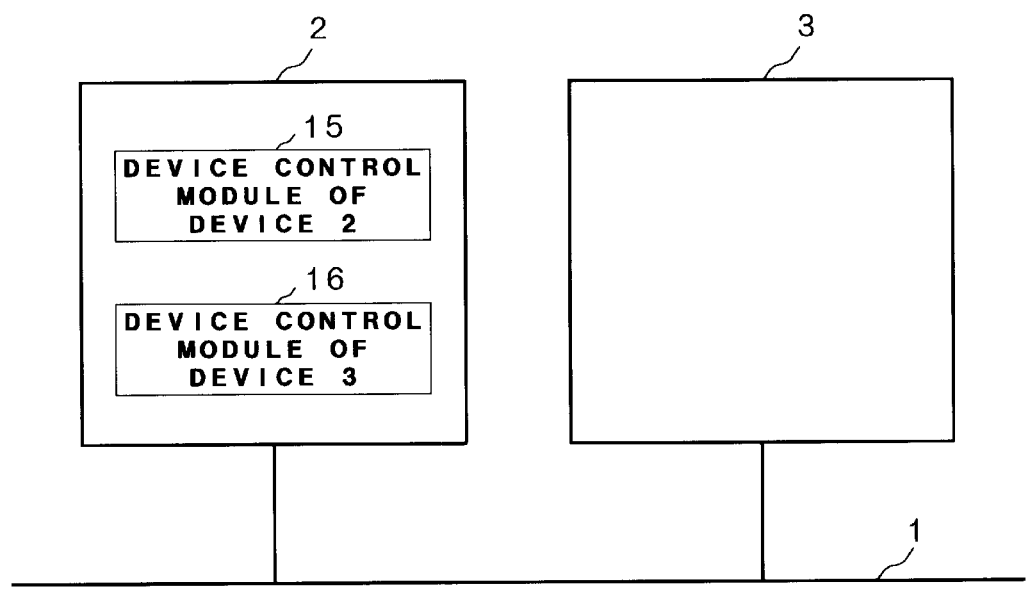
FIG. 3 is an explanatory view explaining the embodiment shown in FIG. 1.
Figure 4:
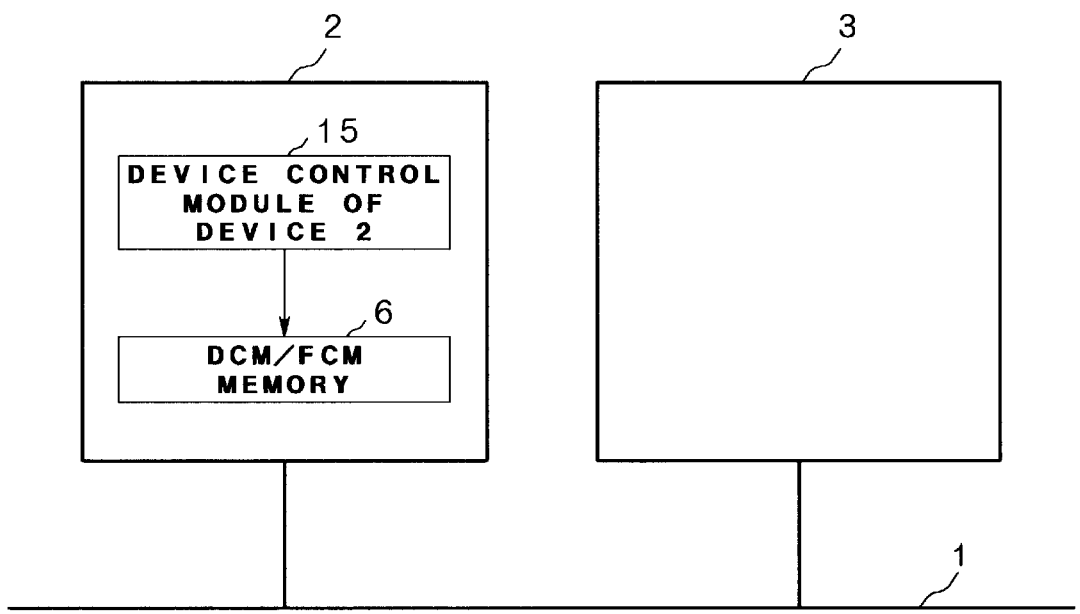
FIG. 4 is an explanatory view explaining the embodiment shown in FIG. 1.
Figure 5:
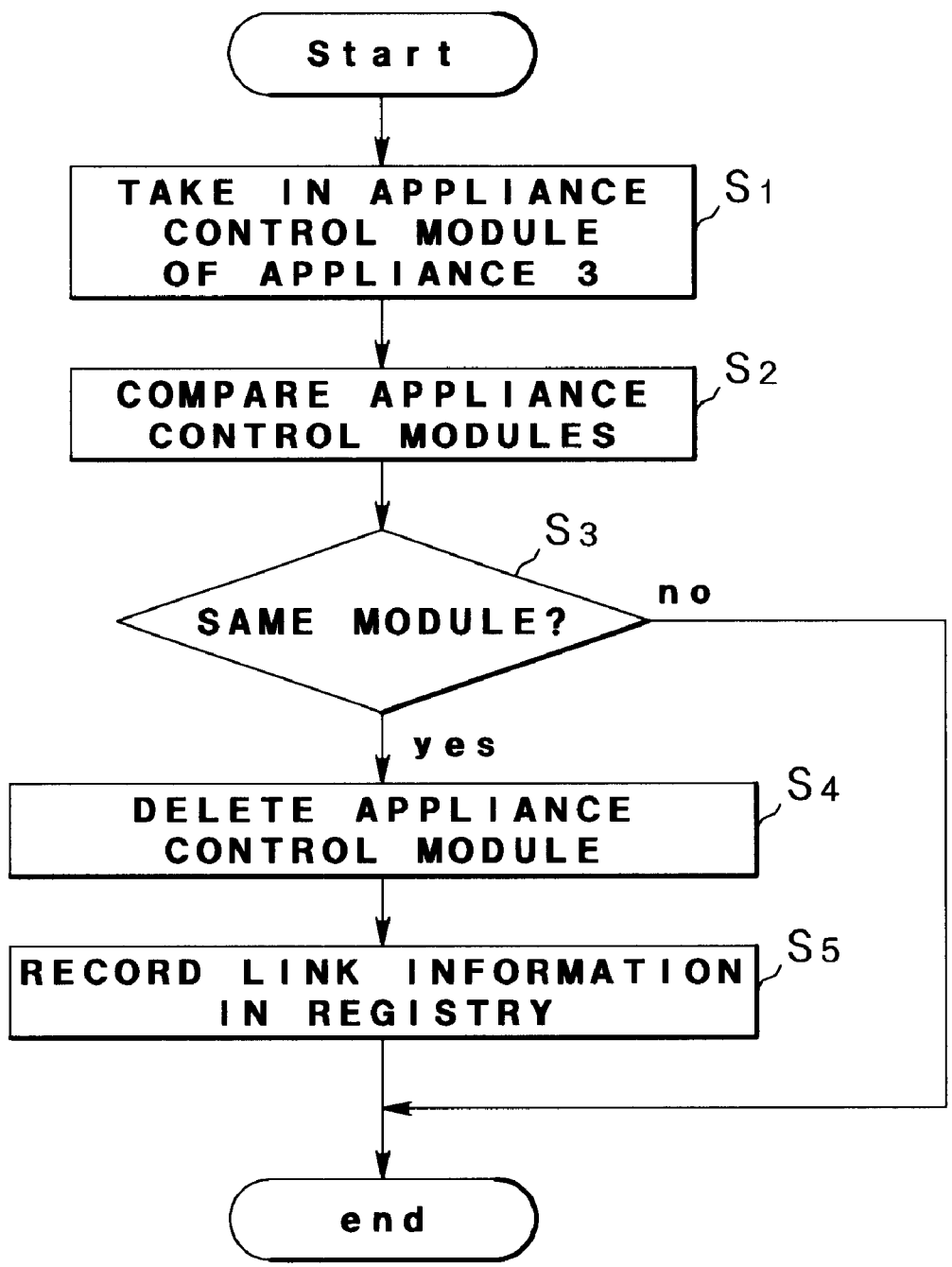
FIG. 5 is a flow chart explaining the operation of the embodiment shown in FIG. 1.
Figure 6:
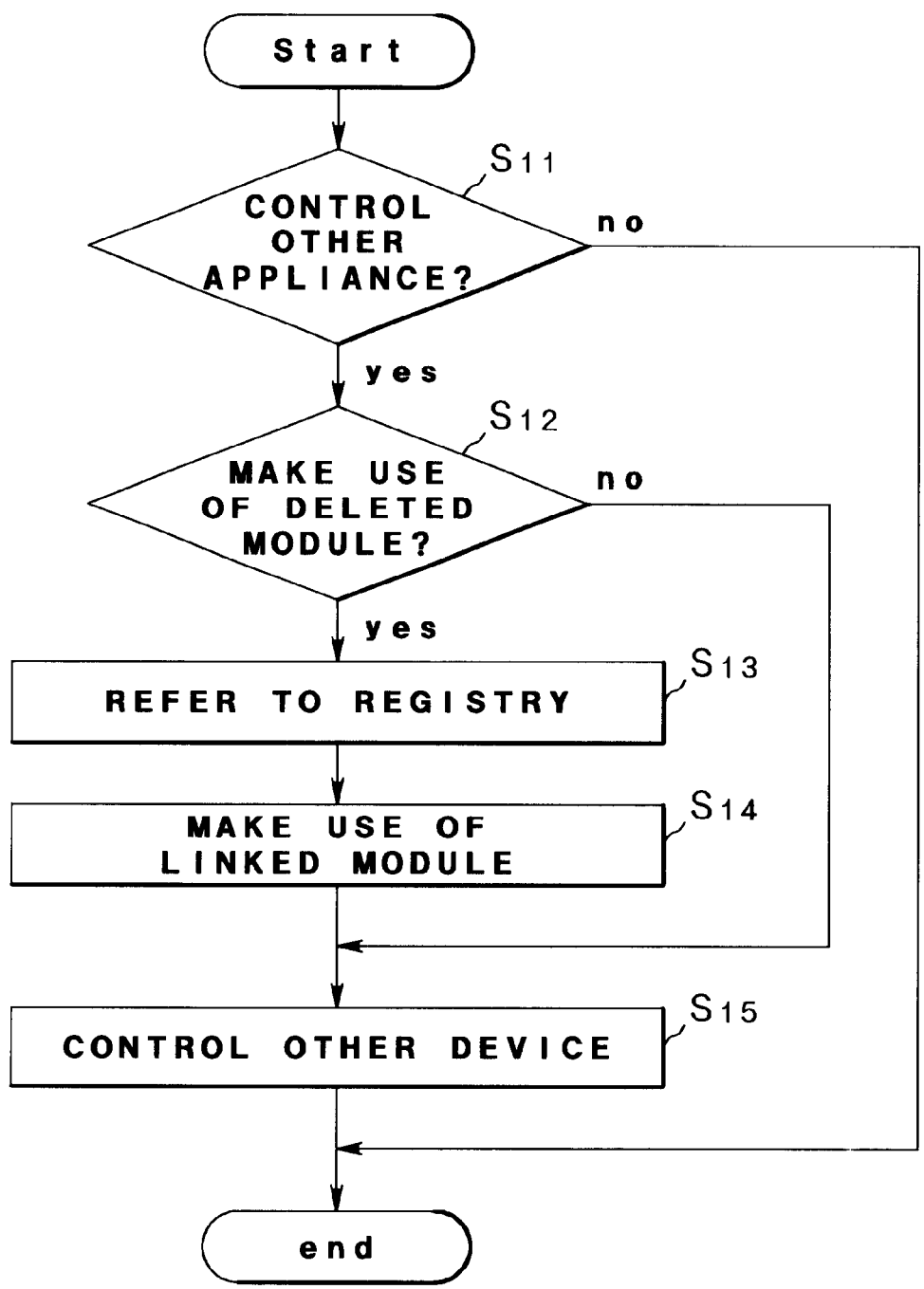
FIG. 6 is a flow chart explaining the operation of the embodiment shown in FIG. 1.

Subsequently, the manner of operation of the embodiment having the above-mentioned constitution is explained hereinafter in conjunction with FIG. 2 to FIG. 6. FIG. 2 to FIG. 4 are explanatory views for explaining the condition of the inside of the DCM/FCM memories and FIG. 5 and FIG. 6 are flow charts explaining the operation.

FIG. 2 shows the condition of the memory right after the devices 2, 3 are connected to the network cable 1. The devices 2, 3 respectively hold the device control modules 15, 16 in the DCM/FCM memories 6, 7. Upon connection of the devices 2, 3 to the network cable 1, the network is reorganized and the device 2 is set as the controller while the device 3 is set as the target.

For example, in case the IEEE 1394 is adopted as the network, upon connection of the devices, a bus reset occurs and topology, ID numbers and the like are set again. Subsequently, the target device transmits information such as the name of maker and the product number to the controller. For example, on the HAVi standard, the SDD (Self Describing Device) is transferred as such information.

Then, the target device 3 transfers the device control module 16 to the device 2. In a step S1 shown in FIG. 5, the DCM/FCM manager 10 of the device 2 takes or incorporates the device control module 16 transferred through the interface 5, the network cable 1 and the interface 4 from the device 3 in the DCM/FCM memory 6 (See FIG. 3).

Then, the DCM/FCM manager 10 compares the device control modules 15, 16 in a step S2. Subsequently, the DCM/FCM manager 10 judges whether they are identical or not in a step S3. In case it is judged that they are not identical modules, the processing is finished. In case it is judged that they are identical, one device control module 16 is erased from the DCM/FCM memory 6 in a step S4.

FIG. 4 shows this condition where only the device control module 15 of the device 2 is stored in the DCM/FCM memory 6. Further, the DCM/FCM manager 10 makes the registry 11 of the device 2 store link information that the device control module 16 of the device 3 is erased and the device control module 15 (hereinafter called "link module") is used for controlling the device 3 (a step S5). That is, the link module is a module for other device used for controlling and making use of functions of a given device.

Then, it is assumed that the device 3 which constitutes the target is controlled by the device 2 which constitutes the controller. It is also assumed that the user performs control of the device 3 with a remote controller attached to the device 2 but not shown in the drawing. When signals are supplied the control part 8 of the device 2 in response to the users manipulation, the control part 8 judges whether the manipulation for controlling other device is performed or not in a step S11 shown in FIG. 6. If the control part 8 judges that the manipulation for controlling other device is performed, the processing is advanced to a next step S12 where the control part 8 judges whether the control based on the user manipulation is the control which makes use of the erased module or not.

If the judgment is affirmative, the processing is advanced to a next step S13 where the link module stored in the DCM/FCM memory 6 is read out from the registry 11 with reference to the link information stored in the registry 11. Subsequently, by making use of the read-out link module (a step S14), the control part 8 outputs a command for controlling the device 3. This command is transmitted to the device 3 through the interface 4, the network cable 1 and the interface 5 and the command based on the link module is performed at the device 3 (a step S15).

The device function module is processed in the same manner as the device control module.

In this manner, according to this embodiment, with respect to the device control module and the device function module transferred to the controller side, the coincidence portion is erased from the memory and only the link information which designate the link module is recorded. Accordingly, at the controller side device, the memory capacity necessary for recording the modules can be drastically reduced.

Figure 7:
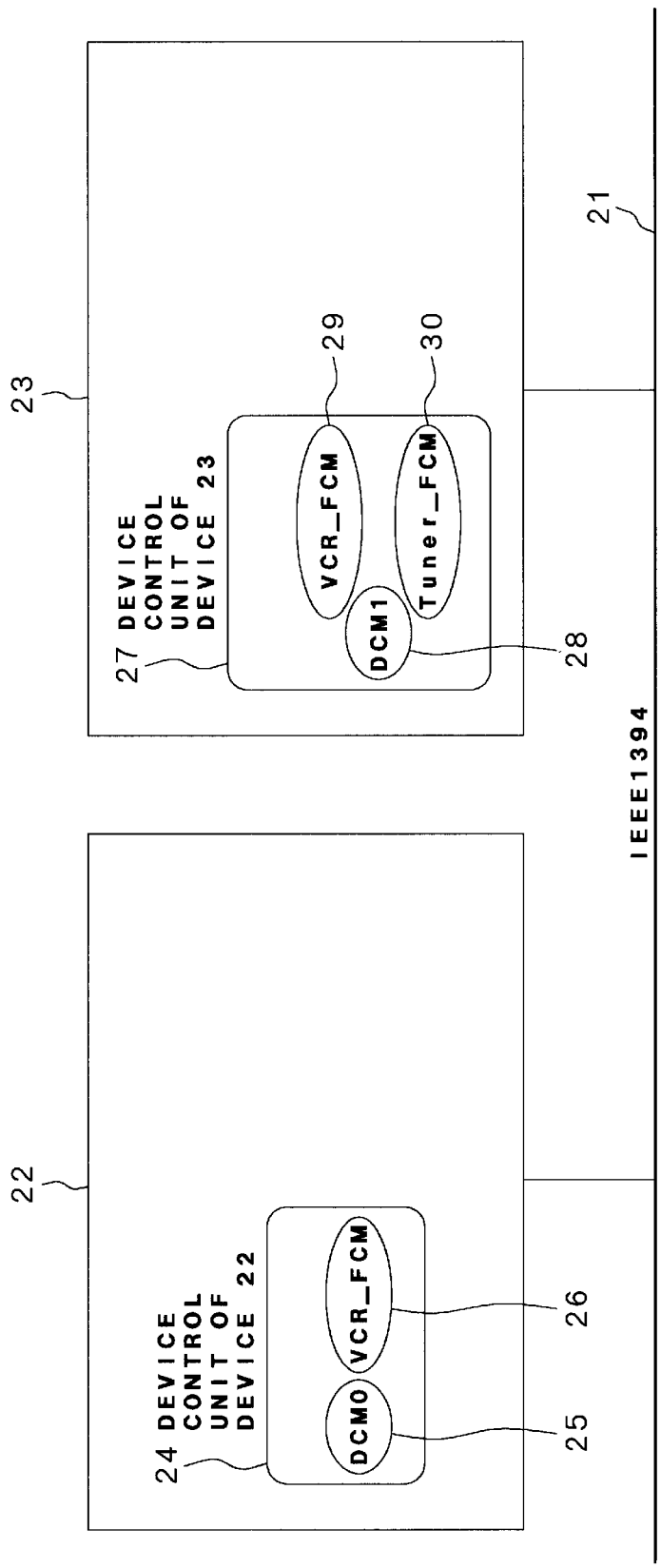
FIG. 7 is an explanatory view explaining another embodiment of the present invention.
Figure 8:
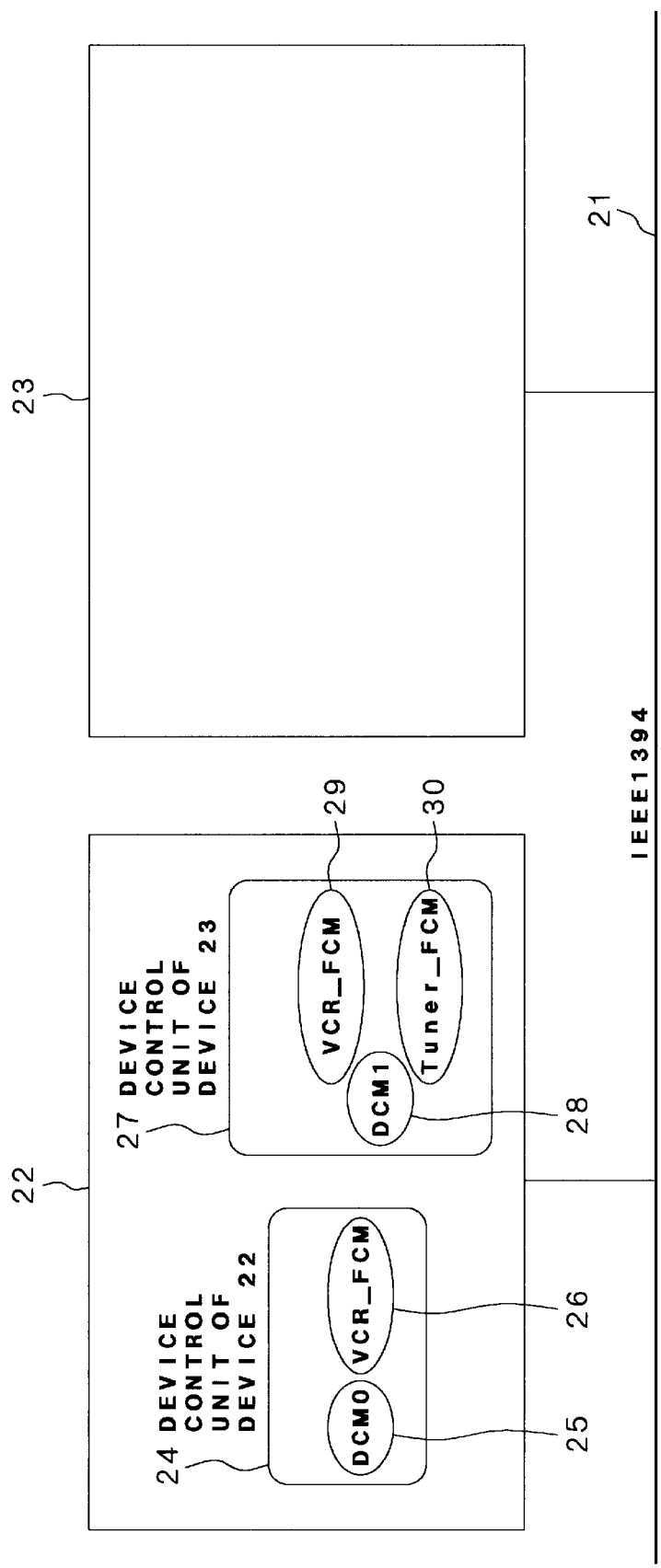
FIG. 8 is an explanatory view explaining another embodiment of the present invention.
Figure 9:
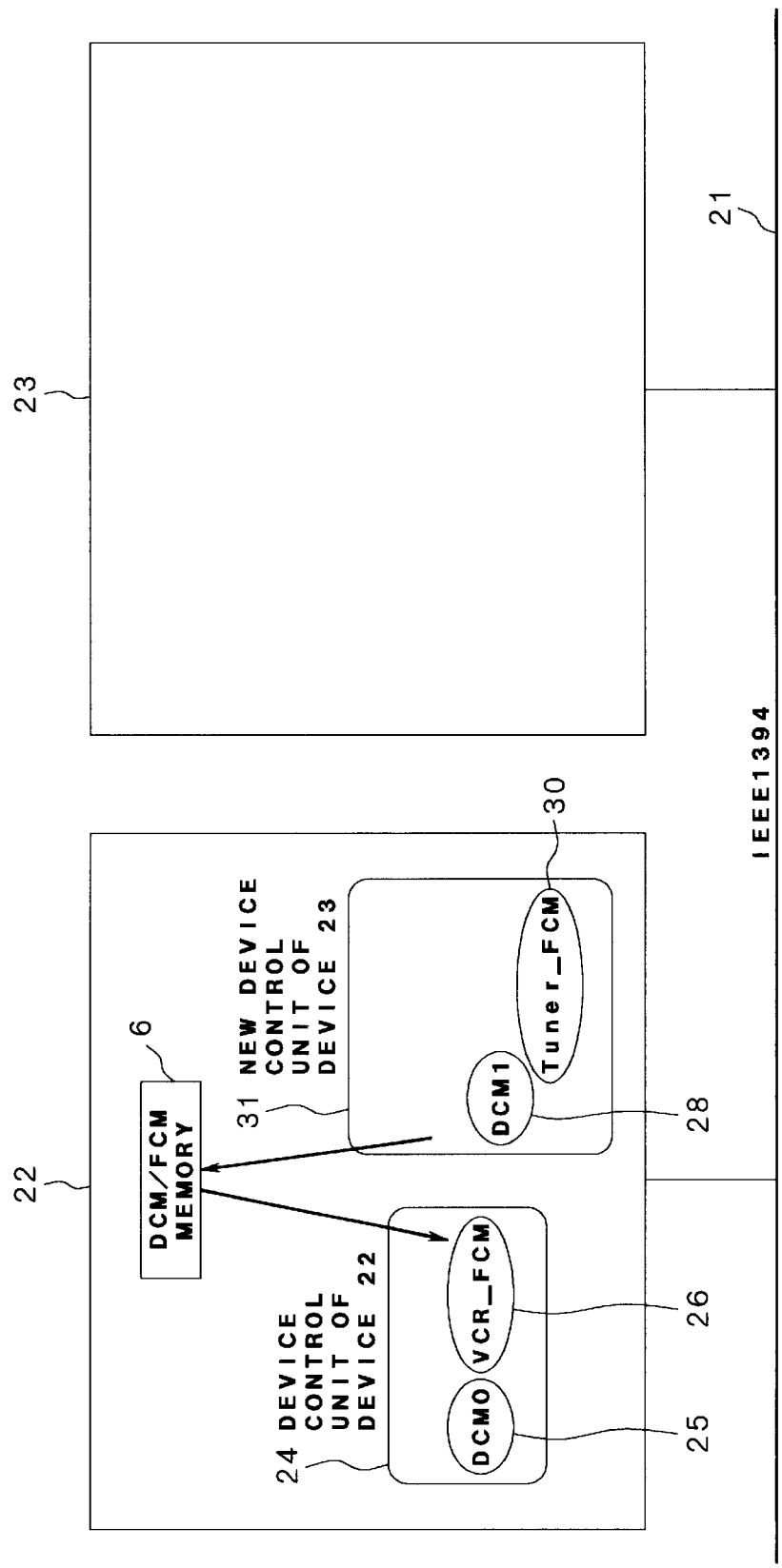
FIG. 9 is an explanatory view explaining another embodiment of the present invention.

FIG. 7 to FIG. 9 are explanatory views for explaining another embodiment of the present invention. This embodiment shows an example where DCMs and FCMs of the HAVi standard are used as device control modules and device function modules to be stored in the DCM/FCM memory and a device control unit consisting of the DCM and the FCM is transferred from the target to the controller.

This embodiment can be also constituted with the same hardware as the embodiment shown in FIG. 1. Control parts of respective devices are designed to control and make use of the devices based on the DCMs and the FCMs.

FIG. 7 shows the condition right after devices 22, 23 are connected to a network cable 21 which corresponds to the IEEE 1394 standard. At the same time, FIG. 7 also shows the content of DCM/FCM memories of the devices 22, 23 before the bus reset occurs.

The device 22 is constituted in the same manner as the device 2 shown in FIG. 1 and is operated as the controller. The device 23 is a target which is constituted in the same manner as the device 3 shown in FIG. 1. A device control unit 24 of the device 22 is stored in the DCM/FCM memory of the device 22. The device control unit 24 includes a DCM0 25 as the DCM and includes a VCR-FCM 26 as the FCM. The DCM0 25 is a module which controls conditions such as an ON/OFF of the device 22, the connection to the network and the like. The VCR-FCM 26 is a module which controls basic functions (reproducing function, recording function, rapid feeding function, unwinding function, stopping function) of a video recorder. That is, the device 22 is, for example, a video tape recorder which only includes basic functions of the video recorder.

A device control unit 27 of the device 23 is stored in the DCM/FCM memory of the device 23. The device control unit 27 includes a DCM1 28 as the DCM and includes a VCR-FCM 29 and a Tuner-FCM 30 as the FCM. The DCM1 28 is a module which controls conditions such as an ON/OFF of the power source of the device 23, the connection to the network and the like. The VCR-FCM 29 is a module which controls basic functions (reproducing function, recording function, rapid feeding function, unwinding function, stopping function) of a video recorder. The VCR-FCM 29 is identical to the VCR-FCM 26. The Tuner-FCM 30 is a module for controlling functions (channel selection function, sound volume control function) of a television tuner. That is, the device 23 is, for example, a video tape recorder which includes basic functions of the video recorder and the tuner function.

In this embodiment, upon detection of the coincidence of the modules, a DCM/FCM manager of controller leaves or reserves only one module out of the coincident modules and erases other modules and reorganizes new device control units of respective devices.

Figure 10:
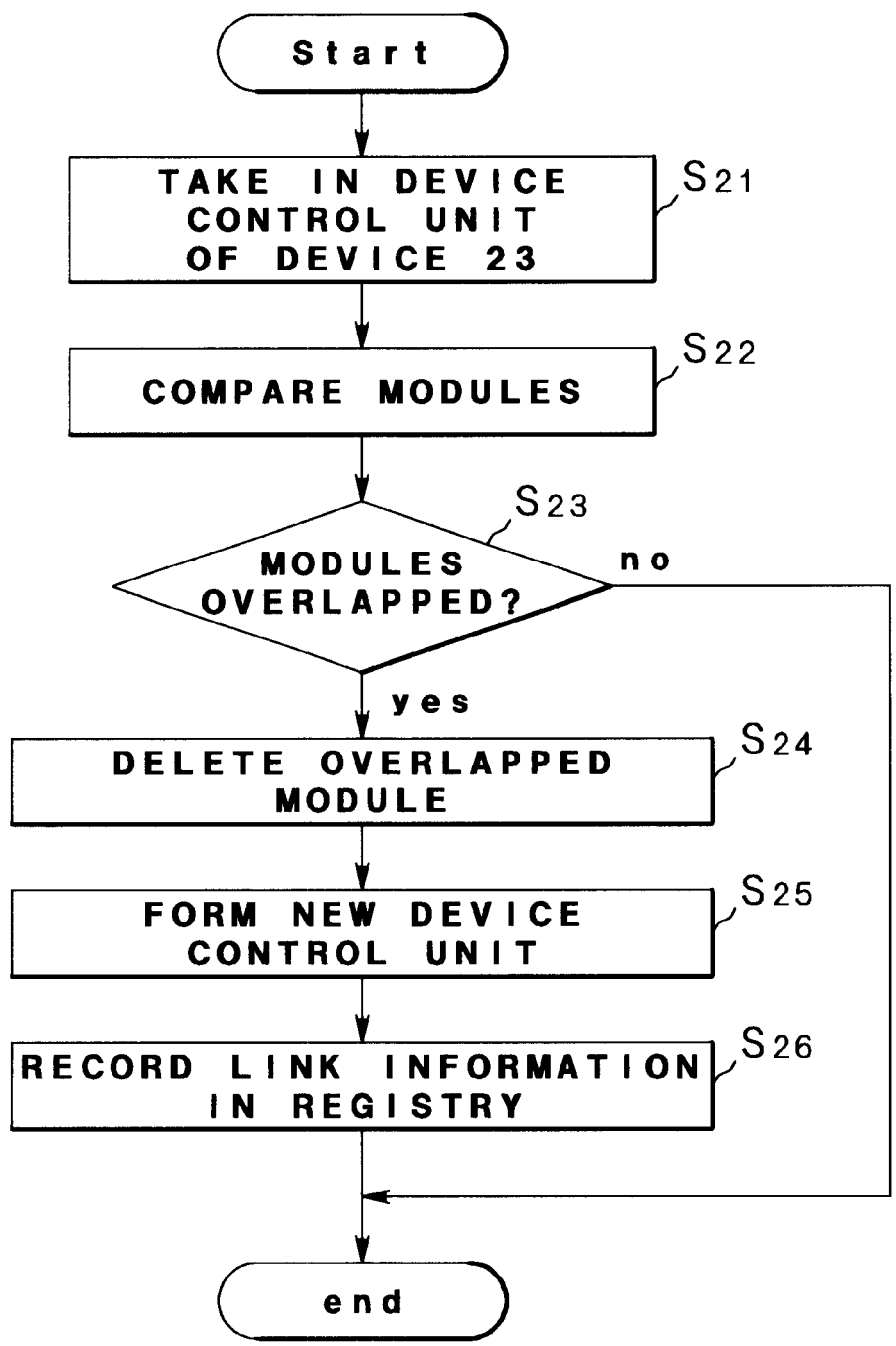
FIG. 10 is a flow chart explaining the operation of the embodiment shown in FIG. 7 to FIG. 9.

Then, the manner of operation of the embodiment constituted in the above-mentioned manner is explained in conjunction with FIG. 8 to FIG. 10. FIG. 10 is a flow chart for explaining the manner of operation of the embodiment.

In this embodiment, the network is also reorganized by connecting the devices 22, 23 to the network cable 1. That is, upon connection of the devices 22, 23 to the network cable 1, a bus reset of the IEEE 1394 occurs and topology, ID numbers and the like is set again. Subsequently, the target device performs the data transmission of the SDD to the controller device and thereafter the transfer of the DCM and the FCM is performed (a step S21 of FIG. 10).

FIG. 8 shows the condition of the inside of the DCM/FCM memory of the device 22 right after the completion of the transfer, wherein the device control unit 24 of the device 22 and the device control unit 27 of the device 23 are stored in the DCM/FCM memory of the device 22.

The DCM/FCM manager of the device 22 detects the coincidence of respective modules in the inside of the DCM/FCM memory (a step S22). In this case, the VCR-FCM 26, 29 are common modules. When the DCM/FCM manager of the device 22 detects the overlapped modules in a step S23, in a succeeding step S24, the VCR-FCM 29 is erased from the memory while reserving only the VCR-FCM 26. Further, in a step S25, a new device control unit 31 of the device 23 is organized by the module remaining after canceling the module. Then, in a step S26, link information on the erasure of the VCR-FCM 29 is stored in a registry.

To control the device 23, the control part of the device 22 generates a command based on the module DCM1 28 read out from the DCM/FCM memory and the device 23 can be controlled accordingly. Further, for example, in case the device 22 makes use of the tuner function of the device 23 from the device 22 side, the control part of the device 22 reads out the Tuner-FCM30 of the device control unit 31 of the device 23 from the DCM/FCM memory and generates the command. Accordingly, the tuner function of the device 23 becomes available.

Further, for example, in making use of the basic function of the video recorder such as the rapid feeding of the device 23 from the device 22 side, the control part of the device 22 generates a command to the device 23 based on the VCR-FCM 26 read out from the DCM/FCM memory based on the link information of the registry. Accordingly, the rapid feeding function of the device 23 becomes available.

In this manner, this embodiment also can achieve advantages similar to those of the embodiment shown in FIG. 1.

In the above embodiment, although the explanation is made with respect to the example where the coincidence portions of the modules are the whole of the modules, even in case the modules are partially coincided with each other, a necessary reduction of the memory capacity becomes possible by erasing the coincidence portions.

Figure 11:
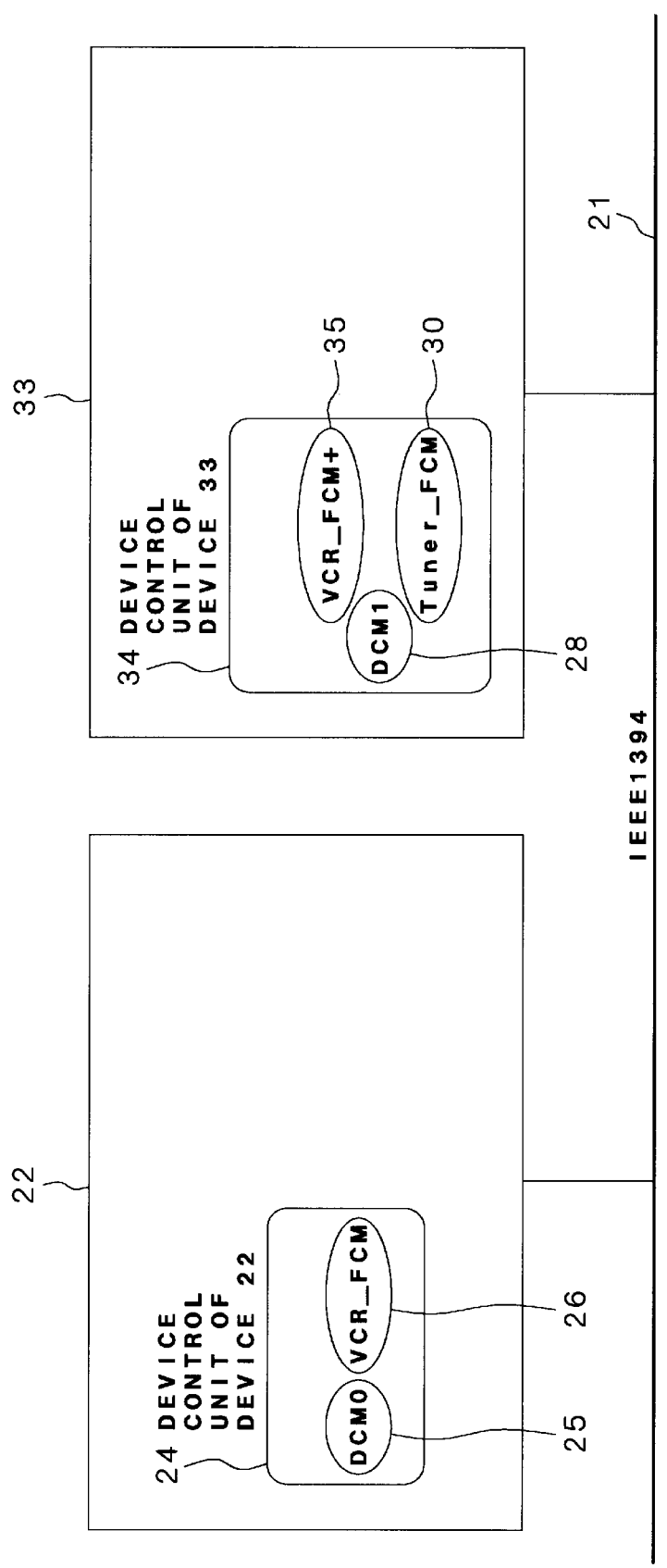
FIG. 11 is an explanatory view explaining still another embodiment of the present invention.
Figure 12:
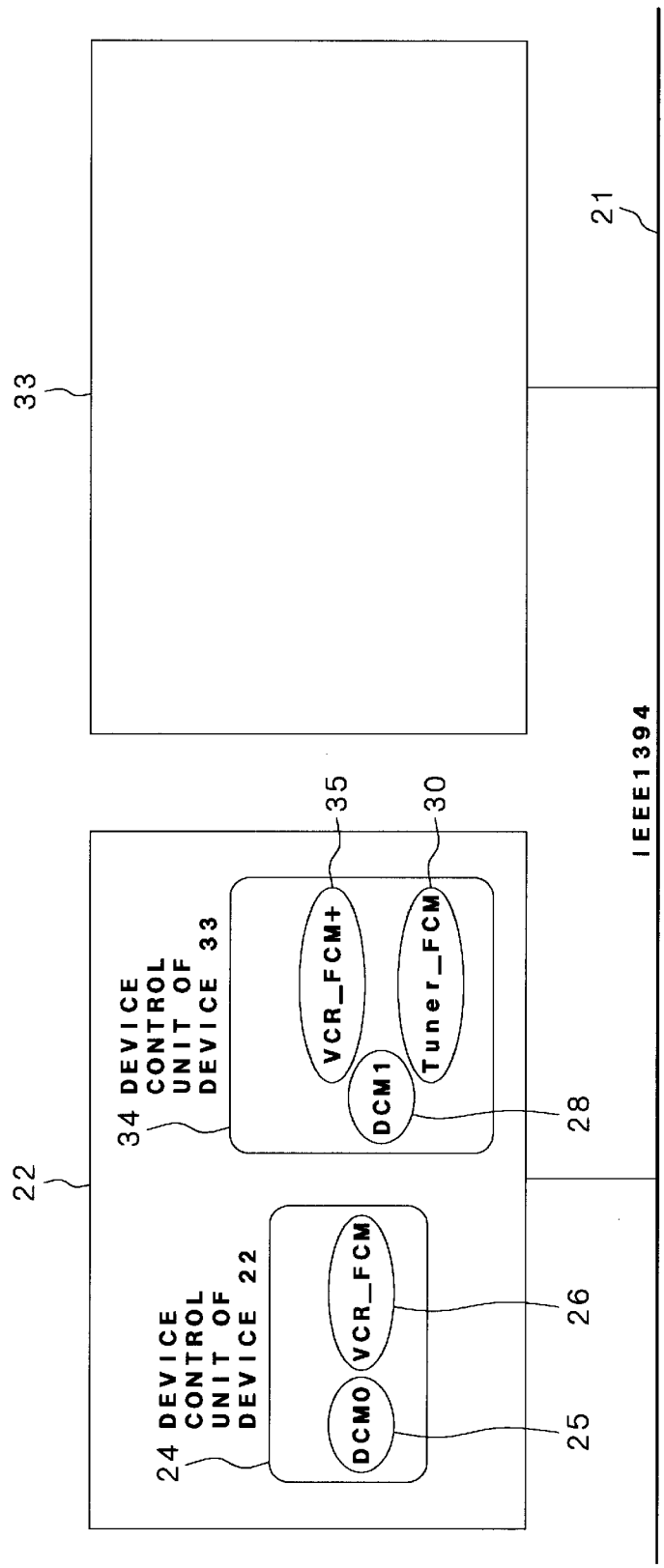
FIG. 12 is an explanatory view explaining still another embodiment of the present invention.
Figure 13:
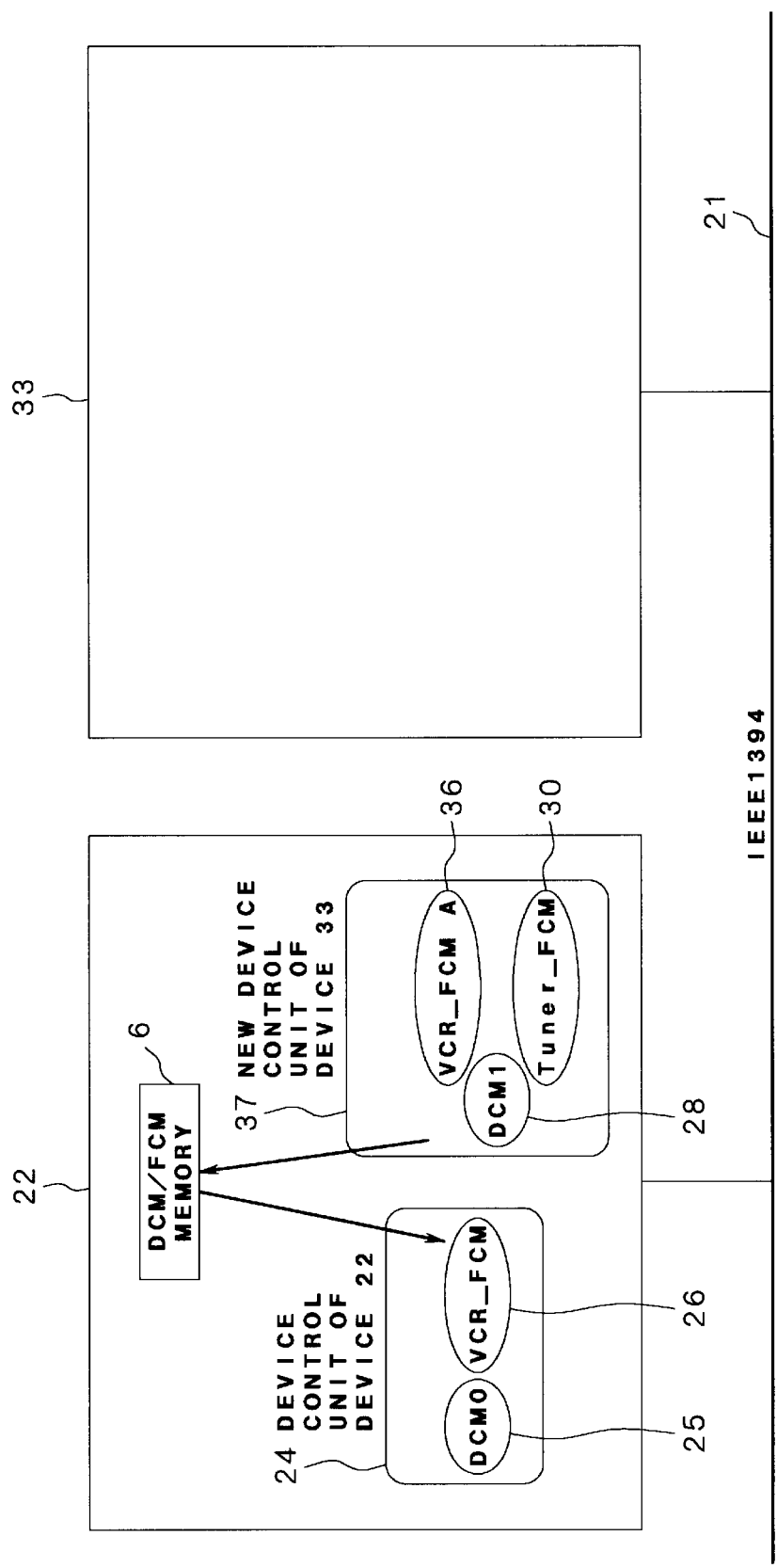
FIG. 13 is an explanatory view explaining still another embodiment of the present invention.

FIG. 11 to FIG. 13 are explanatory views for explaining still another embodiment of the present invention wherein a case in which modules are partially coincided with each other is illustrated. In FIG. 11 to FIG. 13, constitutional elements which are identical to those of FIG. 7 to FIG. 9 are given same numerals and the explanation thereof is omitted.

In this embodiment, the network equipment is also constituted with hardware which is identical with that of the embodiment shown in FIG. 1. Control parts of respective devices are designed to control and make use of the devices based on DCMs and FCMs.

FIG. 11 shows the condition of the network equipment right after devices 22, 33 are connected to a network cable 21 which corresponds to the IEEE 1394 standard and shows the content of DCM/FCM memories of the devices 22, 33 before occurrence of a bus reset.

The device 22 is operable as a controller and the device 33 constitutes a target. A device control unit 34 of the device 33 is stored in the DCM/FCM memory of the device 33. The device control unit 34 includes a DCM1 28 as the DCM and a VCR-FCM+ 35 and a Tuner-FCM 30 as the FCM. The VCR-FCM+ 35 includes a module portion which controls basic functions (reproducing function, recording function, rapid feeding function, rewinding function and stopping function) of a video recorder and a module portion which controls auxiliary functions (skipping function and recording mode altering function).

In this embodiment, upon detection of the partial coincidence (overlapping) of the modules, while reserving one module overlapped portion out of module overlapped portions, the DCM/FCM manager of the controller deletes other module overlapped portions and organizes a new device control unit 37 of the device 33 which includes a new device function module VCR-FCM A 36 (see FIG. 13) with respect to each device.

Figure 14:
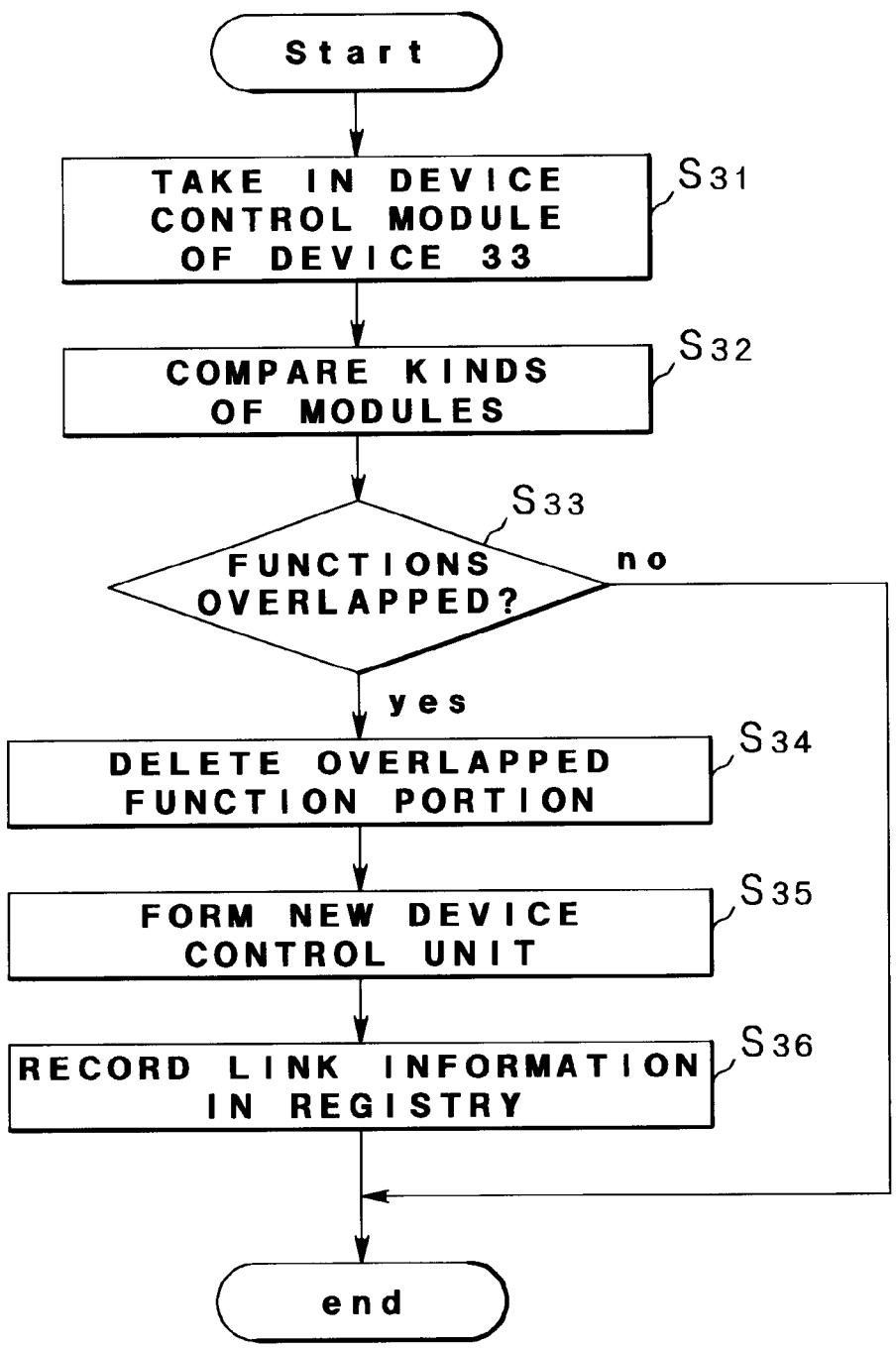
FIG. 14 is a flow chart explaining the operation of the embodiment shown in FIG. 11 to FIG. 13.

Subsequently, the manner of operation of the embodiment having the above-mentioned constitution is explained in conjunction with FIG. 12 to FIG. 14. FIG. 14 is a flow chart for explaining the manner of operation of the embodiment.

After reorganizing the network, the control device unit 34 of the device 33 which constitutes the target is transferred to the device 22 which constitutes the controller (see a step S31 of FIG. 10). FIG. 12 shows the condition of the inside of the DCM/FCM memory of the device 22 right after the completion of the transfer. The device control unit 24 of the device 22 and the device control unit 34 of the device 33 are stored in the DCM/FCM memory of the device 22.

The DCM/FCM manager of the device 22 compares the kinds of modules in the inside of the DCM/FCM memory (a step S32). Then, in a step S33, the DCM/FCM manager judges whether the overlapped functions are present or not. If the overlapped functions are present, while leaving or reserving one module, the overlapped portions are erased from respective modules and only different function portions are left or reserved (a step S34).

In FIG. 12, the module VCR-FCM 26 which controls the functions of the device 24 and the module VCR-FCM+ 35 which controls the functions of the device 33 have the overlapped portions at portions of the basic functions of the video recorder. Accordingly, the DCM/FCM manager deletes the basic function portion from the VCR-FCM+ 35 and generates the new module VCR-FCM A 36 which is constituted by only remaining auxiliary function portion and reorganizes the new device control unit 37 of the device 33 which is constituted by the DCM1 28, the Tuner-FCM 30 and the VCR-FCM A36 (see FIG. 13)(a step S35). Then, in a step S36, link information which relates to the deletion of the overlapped portions of the VCR-FCM is stored in a registry. That is, the link information includes information on which link module is to be referred to with respect to the erased function portion.

In case of controlling the device 33, the control part of the device 22 generates a command based on the module DCM1 28 read out from the DCM/FCM memory. Further, in making use of the tuner function of the device 33 from the device 22, the control part of the device 22 reads out the Tuner-FCM 30 of the device control unit 37 of the device 33 from the DCM/FCM memory and generates a command.

Further, in making use of the basic functions of the video recorder such as the rapid feeding of the device 33 from the device 22 side, based on the link information of the registry, the control part of the device 22 generates a command to the device 33 based on the VCR-FCM 26 read out from the DCM/FCM memory based on the link information of the registry. Then, in making use of the skipping function of the device 33 from the device 22 side, the control part of the device 22 generates a command to the device 33 based on the module VCR-FCM A 36 of the device control unit 37 read out from the DCM/FCM memory.

In this manner, this embodiment can achieve advantages similar to those of the embodiment shown in FIG. 1.

The present invention is not limited to the abovementioned respective embodiments and various modifications can be made. For example, in case the coincident modules are detected, information on devices having coincident modules, information on kinds of coincident modules and deleted coincident modules, link information on coincident modules and the like may be displayed on a monitor screen. Further, for example, the network equipment may be additionally provided with a function which incorporates or take in all device control units which other devices connected on the network hold and displays them after inspection.

Further, although the above-mentioned respective embodiments have been explained with respect to the case where two devices are present on the network, it is apparent that the present invention is applicable to a case where a plurality or a multiplicity of devices are present on the network. Still further, although the embodiments have been explained by employing the IEEE 1394 as the network, the present invention is applicable to various networks which make use of LAN, telephone lines, electric light lines or wireless.

According to the present invention, it is apparent that embodiments which differ in a wide range can be constituted based on the present invention without departing from the spirit and the scope of the present invention. The present invention is not limited to any specific embodiments except for being limited by the appended claims.

What is claimed is:

1. A network equipment comprising;
   a first memory holding a plurality of software modules which control respective devices connected to a network,
   a module administration device which detects coincidence portions between or among a plurality of software modules and makes the first memory means store one remaining coincidence portion after deleting other coincidence portions with respect to the coincidence portions and generates link information for making use of the remaining coincidence portion in place of the deleted coincidence portions, and
   a second memory which holds the link information generated by the module administration device, and
   a control device which reads out the software module stored in the first memory based on the link information and controls other devices connected to the network.

2. A network equipment according to claim 1, wherein the software modules include device control modules which control conditions of respective devices connected to the network and device function modules which control functions of respective devices.

3. A network equipment according to claim 1, wherein the module administration device reads out and obtains the software modules which are held in other devices by connecting respective devices on the network.

4. A network equipment according to claim 1, wherein the network equipment is further provided with a display device which displays contents of processing performed by the module administration device.

5. A networking method comprising;
- a module administration step which detects coincidence portions between or among a plurality of software modules with respect to a plurality of stored software modules which respectively control respective devices connected to the network and stores one remaining coincidence portion after deleting other coincidence portions with respect to the coincidence portions,
- a step which holds link information for making use of the remaining coincidence portion in place of the deleted coincidence portions, and
- a step which reads out the software module stored based on the link information and controls other devices connected to the network.

6. A networking method according to claim 5, wherein the module administration step includes a step which reads out and obtains the software modules which are held in other devices by connecting respective devices on the network.

* * * * *